Feb. 3, 1959  Z. V. WEISEL  2,871,714
AUTOMOTIVE TRANSMISSION
Filed Jan. 30, 1956  4 Sheets-Sheet 4
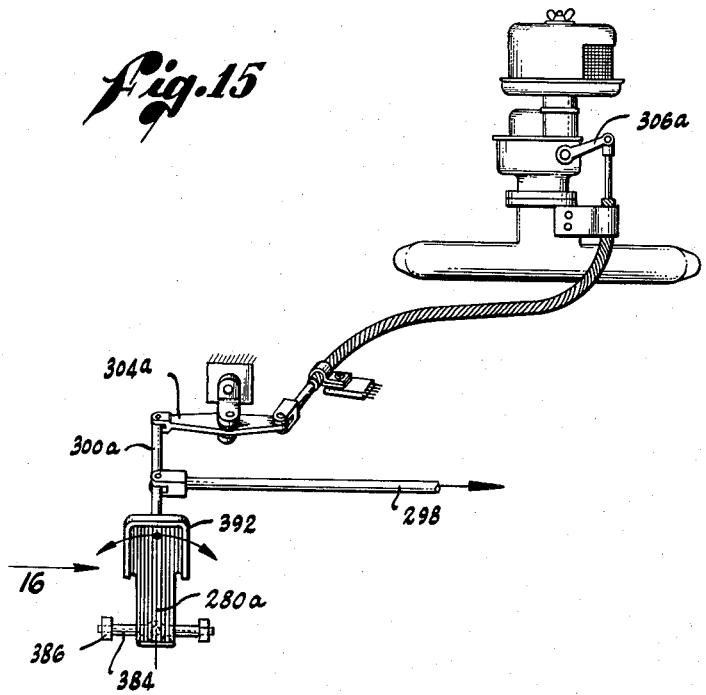
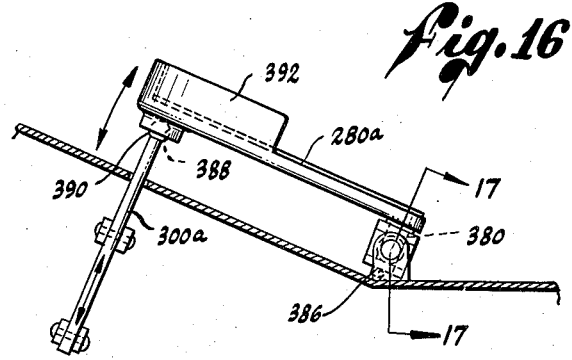
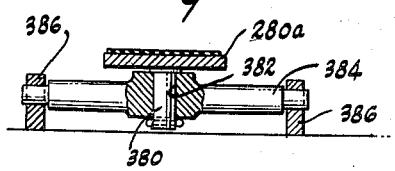
INVENTOR.
ZENAS V. WEISEL
BY Fulwider Mattingly & Huntley
ATTORNEYS

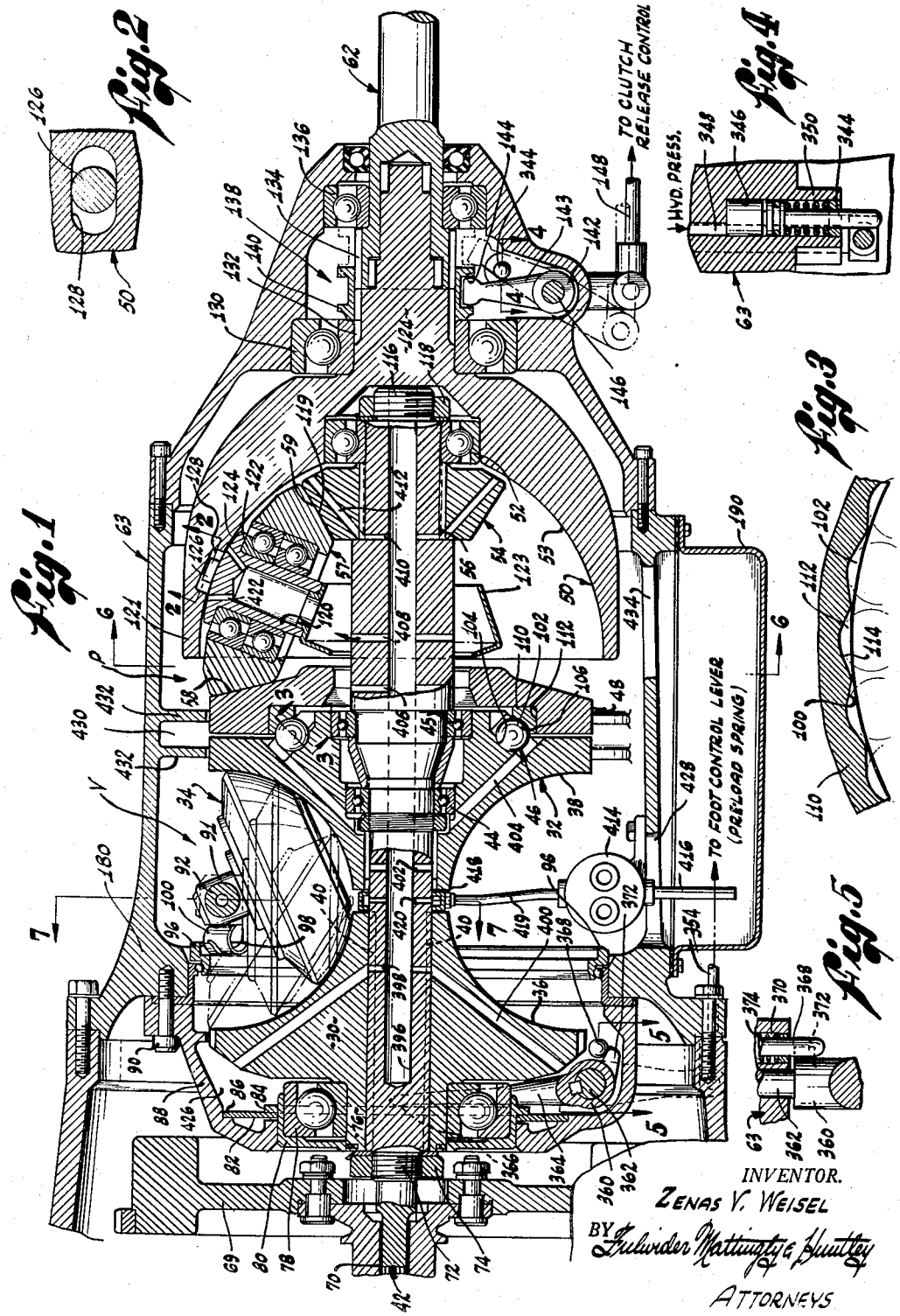

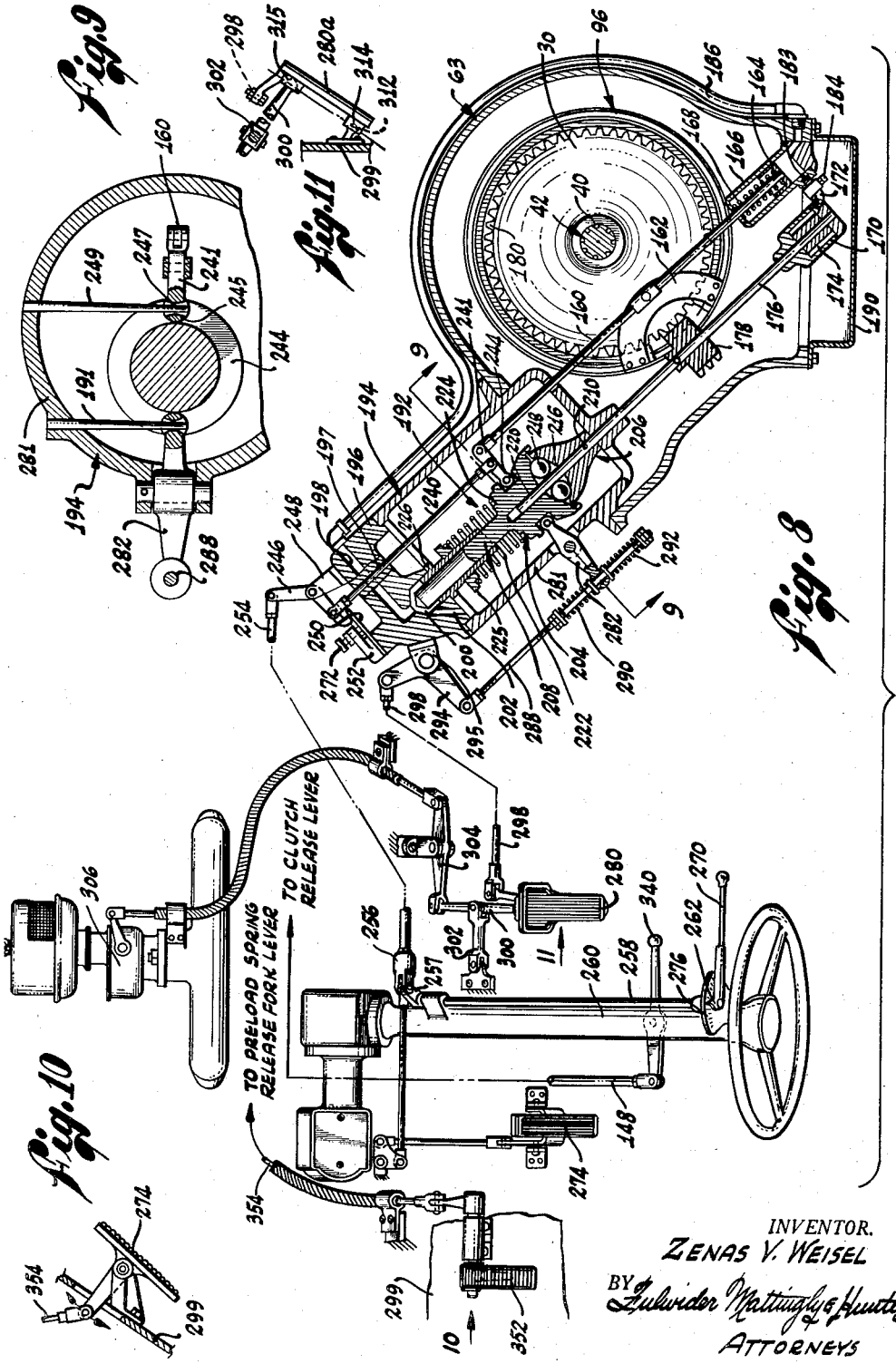

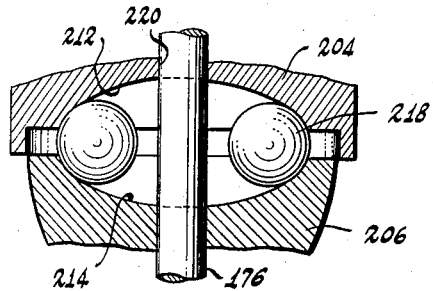
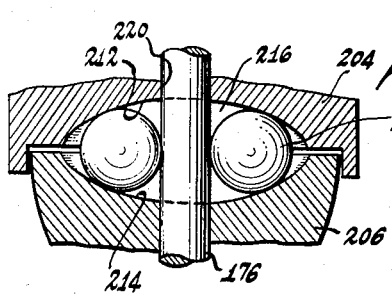
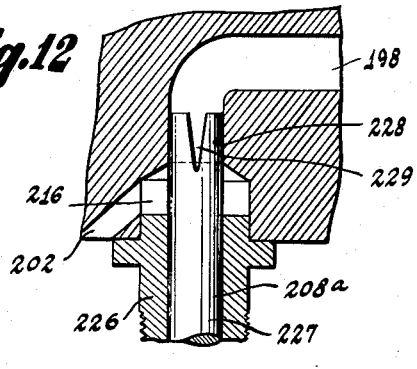
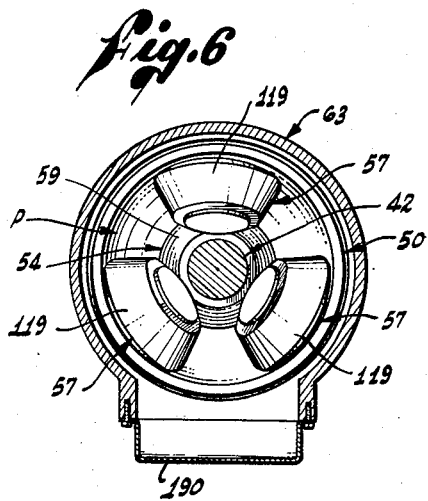
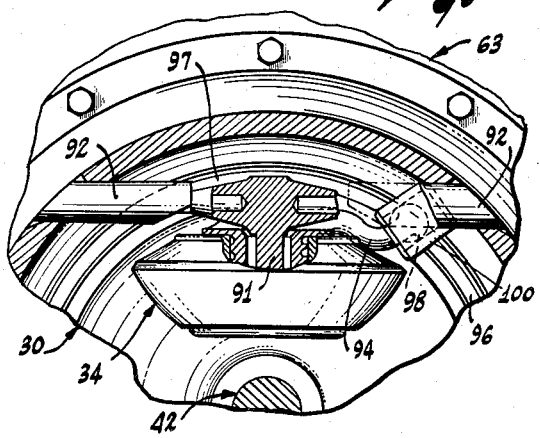
INVENTOR.
ZENAS V. WEISEL

United States Patent Office 2,871,714
Patented Feb. 3, 1959

2,871,714

AUTOMOTIVE TRANSMISSION

Zenas V. Weisel, Los Angeles, Calif.

Application January 30, 1956, Serial No. 562,227

36 Claims. (Cl. 74—190.5)

The present invention relates generally to transmissions and more particularly to a novel variable ratio transmission having a ratio range down to zero output speed.

It is a major object of the present invention to provide a novel and improved variable ratio transmission especially adapted for use in automotive vehicles.

It is a further object of the invention to provide a variable ratio transmission having a range of reduction in ratio extending down to infinity so as to produce a zero output shaft speed, and which affords an increase in output shaft speed in either direction from zero in stepless increments.

A further object is to provide a variable ratio automotive transmission which is inherently silent.

Another object is to provide a variable ratio transmission which when utilized in an automotive vehicle eliminates the need of a separate clutch while affording smooth starting and backing up.

Yet a further object of the invention is to provide a variable ratio transmission of the aforedescribed nature that permits the use of the vehicle's engine as a brake down to a complete stop.

An additional object is to provide a variable ratio transmission of the aforesaid nature which affords a "hill-holder" action without the use of a separate mechanism.

It is yet another object of the invention to provide a variable ratio transmission which is simple in design and rugged of construction whereby it may provide a long and trouble-free service life.

A further object is to provide a variable ratio transmission that is compact in size and light in weight.

Another object of the invention is to provide a variable ratio transmission which will quickly and smoothly respond to either automatic or manual control.

An additional object is to provide a variable ratio transmission of the aforedescribed nature which is extremely efficient at all speeds and under all load conditions.

A still further object is to provide a novel governor for use with the variable ratio transmission of the present invention.

These and other objects and advantages of the present invention will become apparent from the following detailed description, when taken in conjunction with the appended drawings, wherein:

Figure 1 is a central vertical sectional view showing the basic unit of the preferred form of variable ratio transmission embodying the present invention;

Figure 2 is an enlarged sectional view taken on line 2—2 of Figure 1;

Figure 3 is an enlarged sectional view taken on line 3—3 of Figure 1;

Figure 4 is a horizontal sectional view taken on line 4—4 of Figure 1;

Figure 5 is a horizontal sectional view taken on line 5—5 of Figure 1;

Figure 6 is a reduced vertical sectional view taken on line 6—6 of Figure 1;

Figure 7 is a vertical sectional view taken on line 7—7 of Figure 1;

Figure 8 shows a control unit for use with the basic unit of the present invention;

Figure 9 is an enlarged inclined sectional view taken on line 9—9 of Figure 8;

Figure 10 is a vertical sectional view taken from the point designated 10 in Figure 8;

Figure 11 is a vertical sectional view taken from the point designated 11 in Figure 8;

Figures 12 and 13 are enlarged views showing the mode of operation of a governor shown in Figure 8;

Figure 14 is a modified valve for use with the governor shown in Figure 8;

Figure 15 shows an alternate form of throttle pedal mounting for use with the control unit of Figure 8;

Figure 16 is an enlarged vertical sectional view taken from the point designated 16 in Figure 15; and Figure 17 is a sectional view taken on line 17—17 of Figure 16.

GENERAL ARRANGEMENT OF FIGURES 1 THROUGH 7

Referring to the drawings, the basic unit of the automotive transmission embodying the present invention is shown in Figures 1 through 7. The basis unit includes a variable ratio assembly V mounted in series with a planetary type power take-off assembly P. The variable ratio assembly V is of a type similar to that disclosed in my co-pending patent application Serial No. 363,606, filed June 23, 1953, and now Patent No. 2,748,614, issued June 6, 1956, entitled, Variable Speed Transmission. This variable ratio assembly V employs a driving disc, generally designated 30, and a driven disc, generally designated 32, together with a plurality of conically-profiled rotation-transfer rollers, generally designated 34, which bridge the opposed concave surfaces 36 and 38, respectively, of the driving and driven discs. The driving disc 30 is splined, as indicated at 40, to a drive shaft, generally designated 42, connected at its front (or left-hand end in Figure 1) to the engine (not shown) of an automotive vehicle. The driven disc 32 is journaled by ball bearing units 44 and 45 to the intermediate portion of the drive shaft 42. The ratio of the rotational speed of the driven disc 32 to that of the driving disc 30 is controlled by causing the rotation-transfer rollers 34 to spirally roll over the traction face of the input and output discs into the various ratio positions required between limits indicated by their dotted line positions of Figure 1.

The driven disc 32 is keyed by means of a torque responsive unit, generally designated 46, to a ring cone 48, of the power take-off member P. The rear end of the drive shaft 42 journals a generally bowl-shaped carrier 50 of the power take-off member P by means of a ball bearing unit 52. A sun cone 54 is splined to the rear portion of the drive shaft 42, as indicated at 56, forwardly of the ball gearing unit 52. Within the concave cavity 53 of the carrier 50 are mounted a plurality of planetary rollers, generally designated 57, which bridge the opposed surfaces 58 and 59 of the ring cone 48 and the sun cone 54, respectively. The carrier 50 is keyed to the output shaft 62 of the power take-off unit P in a manner to be described hereinafter. The variable ratio assembly V and the power take-off assembly P are enclosed within a stationary housing, generally designated 63, however, if desired these assemblies may be enclosed within two separate housings.

With the aforedescribed arrangement, rotation of the drive shaft 42 and hence of the driving disc 30 will be transferred to the driven disc 32 by the rollers 34 at a ratio which is dependent upon the angular position assumed by the rollers. Suitable means for controlling the angular position assumed by the rollers are fully described hereinafter. The driven disc 32 rotates in the opposite direction from the driving disc 30. Rotation of the driven disc 32 will be directly transferred to the ring cone 48 through the torque responsive unit 46. Simultaneously, the sun cone 54 will be rotated at the same speed as the drive shaft 42 in a direction opposite to that of the ring cone 48.

If the diameter of the ring cone 48 is made twice that of the sun cone 54 (as in the case of the transmission shown and described herein), at such time as the ring cone is caused to rotate at one-half the speed of the sun cone by adjusting the ratio of the variable ratio assembly to a 2 to 1 reduction, the planetary rollers 57 will merely spin about their axes while remaining stationary relative to their respective positions within the housing 63. The carrier 50 will likewise remain stationary at this time. When, however, the speed of the ring cone 48 is increased by shifting the rotation-transfer rollers 34 of the variable ratio assembly V in a clockwise direction relative to their solid line position of Figure 1, the planetary rollers 57 will start rotating about an annular path relative to the housing 63. Such rotation will effect concurrent rotation of the carrier 50, and hence of the output shaft 62, in a direction opposite to that of the direction of rotation of the drive shaft 42. If on the other hand, the rotation-transfer rollers 34 of the variable ratio assembly V are shifted in a counter-clockwise direction relative to their solid line position of Figure 1, the output disc 32 and hence the ring cone 48 will rotate at a speed less than half that of the sun cone 54. The carrier 50 and the output shaft 62 will then be rotated in the same direction as the input shaft 42 but at a lower speed than the latter.

DETAILED DESCRIPTION OF THE BASIC UNIT

Referring again to Figure 1, the front portion of the drive shaft 42 is splined to the engine flywheel 69 at 70 and this flywheel is bolted to the crankshaft flange. Rearwardly of this splined connection the drive shaft is enlarged in diameter and is formed with threads 72 for receiving a retainer nut 74. This retainer nut 74 locks the driving disc 30 against forward movement upon the drive shaft 42 beyond a predetermined point. The front portion of the driving disc 30 is formed with a boss portion 76 which is encompassed by the inner race of a ball bearing unit 78. The outer race of this ball bearing unit 78 is positioned within a collar 80. The driving disc 30 is constantly biased rearwardly relative to the drive shaft 42 as by a Belleville-type dished pre-load spring 82. The inner periphery of this spring 82 is disposed forwardly of a radially extending flange 84 formed on the collar 80. The radially outer portion of the spring 82 is mounted within an annular pocket 86 formed upon a forwardly and inwardly extending section 88 of the housing 63. This section 88 is secured to the front portion of the housing 63 by a plurality of bolts 90. The spring 82 serves to constantly bias the driving disc 30 rearwardly and thereby pre-load the rollers 34 against the driving and driven discs.

The variable ratio assembly V will preferably utilize three of the rotation-transfer rollers 34. Each of these rollers includes thrust members 91 that are pivotally supported between a pair of aligned trunnions 92 having their outer ends secured to the housing 63, as indicated in Figures 1 and 7. Tilting of the rotation-transfer rollers 34 will be effected by means of a control arm 94 upon rotation of a control ring 96 which is rotatably and coaxially mounted within the housing 63, the outer ends of the control arms each being formed with a ball 98 that is disposed within a cup 100 affixed to the control ring.

Although the torque-responsive unit 46 may take various forms, it will preferably include a plurality of balls 102 disposed between a smooth inner raceway 104 formed upon the rear portion of the driven disc member 32 and an outer raceway 106 formed upon a retainer ring 110 that is rigidly secured within a cylindrical cavity 112 formed in the front portion of the ring cone 48. As shown in Figure 3, the outer raceway 106 includes a plurality of pockets 112 defining camming surfaces 114 which are inclined axially forwardly towards the driven disc member 32. With this arrangement, upon the application of a retarding torque upon the ring cone 48 through the output shaft 62 and the power take-off assembly P the balls 102 will tend to cam the driven disc 32 forwardly (towards the left in Figure 1) so as to increase the pressure of the driven disc against the rotation-transfer rollers 34. This application of increased pressure against the rollers 34 by the driven disc 32 effects a concurrent increase in the pressure of these rollers against the driving disc 30. In this manner the power-transmitting ability of these rollers will be increased as the load imposed upon the output shaft 62 is increased. When the load exerted upon the output shaft 62 is reduced the balls 102 will tend to move towards the low spots in the pockets 112 so as to reduce the amount of pressure urging the driven disc 32 forwardly. Accordingly, the pressure exerted by the rollers 34 against the driving and driven discs will also be decreased. In this manner the variable ratio assembly will be capable of providing a maximum service life.

The rear end of the drive shaft 42 is formed with threads 116 for receiving a retainer nut 118 that locks the sun cone 54 and the ball bearing unit 52 in place upon the shaft.

As indicated in Figure 6, the power take-off unit P will preferably utilize three hardened steel cone shaped planetary rollers 57. Each of the rollers 57 will be formed with a frusto-conically inclined driving surface 119. These driving surfaces 119 engage the opposed surfaces 58 and 59 formed upon the ring cone 48 and the sun cone 54, respectively. Preferably, the latter surfaces 58 and 59 will also be hardened so as to provide a long wearing life. Each of the rollers 57 is rotatably supported upon a shaft member 120 having a spherically-shaped flange 121 at its radially outer end. A pair of ball bearings 122 are interposed between each shaft member 120 and its roller 57. A collector ring 123 is secured to the open radially inner end of each of the shaft members 120 by tubular necks 125. The spherically-shaped flanges 121 have a radius the center of which is located at the intersection point of the axis of the shaft member 120 with the axis of rotation of the carrier 50. The profile radius of the concave cavity 53 of the carrier 50 is slightly greater than the spherical radius of the flange 121. The center of the profile radius of the cavity 53 lies on the axis of the shaft member 120 as extended past its intersection with the axis of rotation of the carrier 50. The mid-portion of each of the flanges 121 is formed with a coaxial radially outwardly extending boss 126. Each of the bosses 126 is slidably disposed within elongated slots 128 forming radial extensions of the cavity 53 of the carrier 50, as shown in Figure 2. The independently mounted bosses 126 serve to key the planetary rollers 57 to the carrier 50 while permitting them to freely seek their correct axial and angular position relative to the ring and sun cones. Such an arrangement permits the planetary rollers 57 to adjust their position responsive to slight deflections in the parts of the power take-off unit P resulting from differential expansion, deflections and the like, during the operation of the device. Inasmuch as the thrust pressure upon the planetary rollers 57 is so much greater than the tangential traction force tending to tip them over in a tangential direction there is no need to rigidly secure them to the carrier 50.

The rear central portion of the carrier 50 defines a shaft 124 that is supported within the housing 63 by a suitable ball bearing unit 130. The shaft 124 is formed with axially extending splines 132. Similar splines 134 are formed on the front portion of the output shaft 62. Rearwardly of these latter splines 134, the output shaft is supported by a ball bearing unit 136. A suitable clutch, generally designated 138, is interposed between the shaft 124 and the output shaft 62. This clutch 138 includes an internally splined sleeve 140 that is axially movable between its solid and dotted line positions of Figure 1. When this clutch sleeve 140 is disposed in its solid line position of this figure, the carrier shaft 124 will be keyed to the output shaft 62. When, however, the sleeve is moved rearwardly into its dotted line position, its splines will no longer interconnect the splines of the carrier hub and the output shaft. The carrier shaft will then be disengaged from the output shaft. The clutch 138 also includes a shifting fork 142 having the upper ends of its bifurcations 143 disposed within an annular groove 144 formed in the clutch sleeve 140. The intermediate portion of the shifting fork 142 is carried by a pivot pin 146 which is journaled within the lower rear portion of the housing 63. The lower end of the shifting fork is pivotally connected to a control rod 148.

*Control unit for automatically varying the angle of the rotation-transfer rollers*

When the aforedescribed basic unit is utilized as the automotive transmission of a vehicle the output shaft 62 will be coupled to the driving wheels of the vehicle. Generaly, proper direction of rear wheel rotation will be obtained by placing the ring gear of the vehicle's rear axle bevel gear drive on the opposite side of the bevel gear pinion. This is opposite to conventional automotive practice. The movements of the vehicle may then be controlled by proper regulation of the speed of its engine and the ratio position of the rotation-transfer rollers 34 relative to the opposed surfaces of the driving and driven discs 30 and 32. A suitable control unit for automatically varying the ratio position of the rotation-transfer rollers is shown at the right-hand portion of Figure 8.

Referring to the right-hand side of Figure 8, the control unit includes an elongated rod 160 that is pivotally secured at its intermediate portion to a radially inwardly extending lug 162 formed on the control ring 96. Movement of the shifting rod 160 along its longitudinal axis will impart rotation to the control ring 96. As mentioned hereinbefore, rotation of the ring 96 effects spiraling of the rotation-transfer rollers 34 from one ratio position to another. The lower end of the shifting rod 160 is affixed to a piston 164 reciprocally disposed within a hydraulic cylinder 166. This piston 164 is constantly biased downwardly within the cylinder 166 by a helical compression spring 168. The lower end of the cylinder 166 is in communication with the discharge of an oil pump 170 disposed adjacent and connected thereto by tubing 172. The oil pump's impeller 174 is keyed to the lower end of an elongated pump drive shaft 176 which is rotatably mounted within the housing 63 shown parallel to the shifting rod 160. The intermediate portion of the pump drive shaft 176 is keyed to a worm gear 178, the teeth of which are meshed with complementary teeth 180 formed about the outer periphery of the driving disc 30. It should be particularly observed that in Figure 8 in the interest of clarity, the shifting rod 160 and control ring 96, and the pump drive shaft 176, worm gear 178 and driving disc 30 are shown as being in a common plane, in fact, however, the shifting rod and control ring 96 are disposed rearwardly of the shaft 176, worm gear 178 and driving disc 30.

Preferably, a suitable pressure regulating valve 184 will be mounted in the tubing 172 connecting the discharge of the pump 170 and the lower portion of the hydraulic cylinder 166. The lower portion of this cylinder is formed with a metering orifice 183 that is smaller in diameter than that of an oil return line 186 which extends from the lower portion of the cylinder 166. When the pump 170 supplies excess oil volume to the tubing 172, the pressure regulating valve 184 will open and the excess oil, i. e. the outlet flow from the pressure regulating valve, will be discharged into the oil sump 190. With this arrangement, the volume of oil being pumped into the lower portion of the hydraulic cylinder 166 may be limited at all times to a certain quantity. The inlet (not shown) of the oil pump 170 is disposed in an oil sump 190 secured to the lower portion of the housing 63.

The amount of oil flowing through the return line 186 may be automatically regulated by means of a governor, generally designated 192. This governor 192 is mounted within a suitable case 194 secured to one side of the upper portion of the housing 63. The head 196 of the case 194 is formed with a passage 198 connected at one side with the upper end of the return line 186 and emptying at its opposite end into the upper end of a conical valve chamber 200. An outlet passage 202 connects the valve chamber 200 with the upper interior of the case 194.

The governor 192 includes an upper member 204 and a lower member 206 coaxial therewith. The upper member 204 is formed with a conical valve element 208 that seats within the valve chamber 200. The lower member 206 is secured by a pin 210 to the upper portion of the pump drive shaft 176 whereby it will be rotated thereby. As shown in Figure 12, confronting surfaces 212 and 214 of the upper and lower members 204 and 206, respectively, cooperate to define a generally hemispherical chamber 216 wherein are disposed a plurality of ball elements 218. The lower portion of the upper member 204 is coaxially formed with a bore 220 which journals the upper end of the pump drive shaft 176 and is centered thereby relative to the lower governor member. The upper governor member 204 and hence its valve element 208 is movable toward and away from the seat of the valve chamber 200. This upper governor member 204 is constantly biased downwardly away from the seat of the valve chamber 200 by a helical compression spring 222 interposed between a shoulder 224 formed on said member and an adjustment nut 225 threadedly carried upon a downward cylindrical extension 226 of the head 196 of case 194. The cylindrical extension 226 slidably houses the valve element 208.

With this arrangement, the governor's upper member 204 will normally be maintained in its position of Figures 8 and 12 by the downwardly-acting force of the spring 222. The oil discharged from the pump 170 will then be free to pass from the lower end of the cylinder 166 through the return line 186, passage 198, valve chamber 200 and outlet passage 202 into the upper interior of the case 194. From this point the oil can flow downwardly through the case 194 and housing into the oil sump 190. At this time, the piston 164 will be disposed in its neutral position of Figure 8 and the rotation-transfer rollers 34 will be disposed in their neutral (solid outline) position of Figure 1 in 2 to 1 reduction position.

When the vehicle is to be started in motion, the rotational speed of the vhicle's engine and hence that of the driving disc 30 and pump drive shaft 176 will be increased. Centrifugal force will then urge the ball elements 218 of the governor 192 radially outwardly within the chamber 216 from their position of Figure 12 towards their position of Figure 13 so as to move the governor's upper member 204 upwardly and thereby move the valve element 208 towards a closed position. The flow of oil through the return line 186 will then be reduced with a consequent increase in the pressure existing within the lower portion of the cylinder 166. The piston 164 and hence the shifting rod 160 will then be moved upwardly. Such upward movement of the latter will effect clockwise rotation of the control ring 96 (relative to Figure 8) so as to effect concurrent clockwise tilting of the rotation-transfer rollers 34 (relative to their solid line position of Figure 1). The various elements of the basic unit will then operate in the manner described hereinbefore so as to impart rotation of the output shaft 62 of the power take-off member P tending to bring about forward motion of the vehicle. It should be observed that before the piston 164 can move the control ring 96 so as to change the ratio of the rollers 34 and thereby give an increase in vehicle speed, the pressure within the cylinder 166 must be slightly greater than that necessary to balance the force of the return spring 168. Therefore, the governor's valve element 208 must be forced towards a closed or seated position with just enough force to restrict the outflow through the valve chamber 200 sufficiently to produce this required back pressure in return line 186 and in the control cylinder 166. The pressure in the return line 186 acts upon the exposed area of the valve element 208 producing a given force which assisted by the downwardly acting force of the spring 222 must just be balanced by the upwardly acting axial force component of the governor ball elements 218. The aforedescribed governor system should be so proportioned that as the engine speed is increased slightly above the idling speed (the governor being driven at speeds directly proportional to engine speed) the governor's ball elements 218 will exert slightly more pressure than is required to create a pressure to exactly balance that of the return spring 222 at a "neutral" ratio of the rollers 34 so that the pressure in the control cylinder 166 will increase to a certain extent and the control ring 96 will move to change the ratio position of the rollers 34 and the vehicle will start moving. A further increase in the speed will cause the governor's ball elements 218 to exert a still greater upwardly directed force tending to further move the governor valve element 208 towards a closed position. In this manner a further increase in the oil pressure existing within the cylinder 166 and a further increase in the ratio position of the rollers 34 will be accomplished so as to further increase the speed of the vehicle. Thus, in a step-by-step manner the engine speed can be increased and the ratio position of the rollers 34 will similarly change in a step-by-step movement on up into a one to one overall ratio and thence on into overdrive. It should be observed that for every ratio position of the rollers 34, a certain pressure is required to exist within the control cylinder 166 acting upwardly against the underside of the piston 164 and conversely a certain similar downwardly acting force is exerted upon the exposed end of the governor's valve element 208 so that there is a definite governor speed and thus engine speed corresponding to each ratio position. The ratio position corresponding to a given engine speed may be controlled principally by the shape of the profile of the two confronting surfaces 212 and 214 of the upper and lower governor members 204 and 206, respectively.

Referring now to Figure 14, there is shown an alternate type of valve element 208a for use within the valve chamber 200a. The valve element 208a includes a cylindrical plug 227 which takes the place of the conical valve element 208 shown in Figure 8. The upper end of this plug 227 is slidably disposed within the vertical portion 228 of the passage 198. A V-shaped notch 229 extends downwardly from the upper end of the plug. In operation, downward movement of the valve element 208a will effect concurrent downward movement of the notch 229 into the valve element 200a so as to permit oil entering the passage 198 to flow into and through the valve chamber. This arrangement permits a longer valve element travel for a given change in oil flow rate as compared to the construction of Figure 8. In this manner the action of the valve element 208a is de-sensitized.

Manual hand control

A manual hand control for over-riding the effect of the governor 192 will preferably be provided for the control unit. A suitable manual hand control is shown at the left-hand side of Figure 8. This manual hand control includes an auxiliary shifting rod 240 that is pivotally secured at its lower end to a link element 241 which is in turn pivotally attached at one end to the upper end of the main shifting rod 160. The opposite end of the link element 241 is disposed in a groove 244 formed in the upper member 204 of the governor 192 and centralized in a special manner as illustrated in Figure 9. Referring to Figure 9, the inner end of the link element 241 is formed with a ball 245 through the center of which is formed a bell-mouthed hole 247. A tapered spring pin 249 which is anchored in the wall of the governor's case 194 extends into the bell-mouthed hole 247 and acts to hold the ball 245 of the link element 241 in a fixed position with a predetermined amount of force and to return it to this fixed position should it be displaced therefrom. The groove 244 formed in the upper member 204 of the governor 192 is of sufficient width and so arranged relative to the inner end of the link element 241 and its centralizing spring pin 249 that the governor's valve element 208 may traverse its full operating range in automatic operation without contacting the ball 245 of the link element 241. The upper portion of the auxiliary shifting rod 240 extends through a clearance slot 197 formed in the head 196 of case 194, with its upper end protruding therethrough and pivotally connected to a V-shaped lever 246. The midportion of this lever 246 is pivotally supported upon the head 196 by a bracket 248. The end of the lever 246 adjacent the top of the auxiliary shifting rod 240 rests upon the free end of the spring leaf stop 250. The other end of this spring leaf stop 250 is rigidly affixed to a mounting element 252 formed upon the head 196. The opposite end of the lever 246 is pivotally connected to one end of a control bar 254. The other end of this control bar 254 is anchored to a clevis 256 which is pivotally connected to the free end of a lever 257 having its opposite end attached to the lower end of a shaft 258. The shaft 258 is supported by the steering column 260 of the vehicle. The upper end of the shaft 258 is keyed to a hand-operated selector 262.

With this arrangement, the hand-operated selector 262 may be utilized by the driver to over-ride the governor and also to effect reverse movement of the vehicle. In Figure 8, the parts of the control unit are shown in a neutral position. Movement of the shifting rod 160 upwardly from its position in this figure by means of the selector 262 will raise the upper member 204 of the governor 192 regardless of the speed at which the vehicle's engine is rotating. The valve element 208 will then restrain the flow of oil from the lower portion of the hydraulic cylinder 166 so as to cause the piston 164 to rotate the control ring 96 clockwise from its position of Figure 8. In this manner the rotation-transfer rollers 34 will be caused to spiral into a ratio position for imparting rotation to the drive shaft 62 tending to bring about forward motion of the vehicle. If the selector 262 is moved in the opposite direction, however, it will further open the governor valve element 208, thereby further reduce the hydraulic pressure in the control cylinder 166 and allow the return spring 168 to rotate control ring 96 to cause the rollers 34 to spiral into a ratio position which will in turn cause the drive shaft 62 to rotate in an opposite direction.

The travel of the control ring 96 to positions beyond that at which it is disposed for a zero wheel speed of the vehicle (neutral) is checked by means of a spring leaf stop 250 which is affixed to the upper end of the case 194. The spring leaf stop 250 should have greater rigidity than the compression spring 222 and so as to restrain the latter against effecting movement of the shifting rod 160 downwardly past its neutral position of Figure 8. An additional means for restraining inadvertent movement of the rotation-transfer rollers 34 into reversing position may be provided by a suitable stop (not shown) on the selector mechanism 262 over which the lever 270 thereof must be lifted before the shifting rod 160 may be lowered into the reverse ratio range. An adjustment screw 272 is carried by the spring mounting element 252 for setting the shifting rod 160 in a zero output speed position.

Optionally, a suitable pedal 274 engageable by the left foot of a driver may be connected to the clevis 256 for use in conjunction with the hand lever 270 of the selector 262 in over-riding the governor 192. The centralizing power of the spring pin 249 described hereinabove in conjunction with the link element 241 should be greater than the operating force required to move this hand lever 270. It should be observed that the lever 270 follows each change of the shifting rod 160, and hence it may act in cooperation with a suitable selector panel 276 as a ratio position indicator.

Throttle pedal control

Referring to Figure 8, the throttle pedal 280 may also be utilized to over-ride the effect of the governor 192. To this end the left sidewall 281 of the case 194 pivotally supports the mid-portion of a link element 282. The end of the latter that is positioned within the case 194 is disposed in a groove 244 formed in the upper member 204 of the governor 192. The opposite end of the link element 282 is ball-shaped and formed with a bell-shaped hole 285 that supports a control rod 288. A pair of helical centering springs 290 and 292 are carried by the control rod 288 on opposite sides of the ball-shaped end of link element 282. Referring to Figure 9 it will be observed that the inner end of the link element 282 is also ball-shaped and is connected to the free end of a spring finger 191 similar to the spring finger 249 described hereinabove in conjunction with the link element 241. Accordingly, the inner end of the link element 282 is centralized in the groove 244 of the governor's upper member 204 in the same manner as the aforedescribed link element 241. The upper end of the control rod 288 is pivotally secured to one leg of a V-shaped lever 294 having its mid-portion pivotally mounted by a bracket 295 formed on the head 196 of the case 194. The other leg of the V-shaped lever 294 is attached to one end of a control bar 298.

The control bar 298 is secured at its opposite end to the upper end of the throttle pedal 280. The latter is so mounted upon the floorboard 299 of the vehicle that it may move laterally as well as in a vertical plane. This pedal 280 is securely mounted to the upper end of a lever 300 having its mid-portion pivotally connected to one end of a link 302. The other end of this link 302 is pivotally anchored to the frame of the vehicle. The lower end of the lever 300 is pivotally attached to one side of a cross-arm 304. The mid-portion of the cross-arm 304 is anchored to the frame of the vehicle and its other side is connected to the throttle 306 of the vehicle's engine. Referring to Figure 11, the throttle pedal 280 is formed at its lower end with a socket 312 which receives a ball 314 that is anchored to the floor board 299 of the vehicle. The upper portion of the throttle pedal 280 is secured to the lever 300 and the control bar 298 by a second ball and socket unit 315. With this arrangement the throttle pedal 280 may be tilted as it is moved in a vertical plane.

With this arrangement, the driver may exert lateral pressure upon the throttle pedal urging it to the right for a change in ratio to give higher engine speed or to the left to give lower engine speed at the same time that he depresses said pedal. In urging the throttle laterally to the right the control bar 298 and the lever 294 will then raise the control rod 288 and compress the spring 292 a controlled amount depending upon the amount of lateral force applied by the driver. The force of this spring 292 acting through link element 282 in order to affect the governor must be sufficient to overcome the centralizing effect of the spring rod 191 shown in Figure 9. The excess force will be transmitted to the governor and will be added to the spring force of the governor's spring 222 which will then be sufficient to overcome the centrifugal force of the rotating ball elements 218 forcing them radially inwardly to a new position of equilibrium and opening the governor valve element 208. This will serve to reduce the hydraulic pressure in the control cylinder 166 and thereby bring about a change in ratio position of the rollers 34 to permit the engine to rotate at higher speed for the same vehicle speed. It should be noted particularly that the effect of this control action by the driver is not one of moving the governor valve 208 a certain distance. Rather, it is one of increasing the stiffness of the governor spring 222. Thus, it does not impede the free action of the governor for the latter is still under full control of the ratio change over the full range of ratio and speed. The driver has merely increased the stiffness of the governor spring 222 which will then govern ratio range to provide a higher engine speed for a given vehicle speed throughout the full range of operation. It will be observed that lateral pressure on the throttle pedal 280 to the left relative to Figure 8 will effect compression of the spring 290 which in a similar manner will act to weaken the force of the governor spring 222 so as to thereby govern the ratio position of the rollers 34 and give a lower engine speed for a given vehicle speed throughout the full range of operation. The driver is thus afforded a means for modifying the rate of acceleration of the vehicle from that inherently provided by the design factors of the governor mechanism. Such design factors will be proportioned to provide a pleasant rate of acceleration for each increment of vehicle speed up to the maximum. By providing a variable ratio transmission having a complete range from an infinite reduction on up through a one-to-one ratio and into two-to-one overdrive (for example) the driver may select a desired ratio by lateral pressure on the throttle pedal 280 which will permit full engine speed at any vehicle speed. If the throttle is opened wide, full power may be applied so as to provide a maximum rate of acceleration. Alternately, the driver may obtain a slow acceleration rate by application of lateral pressure to the left on the throttle pedal 280 while depressing it only slightly. Such an arrangement allows the driver to use the engine for all but emergency braking without removing his foot from the throttle pedal. The engine may be used for braking all the way down to a complete stop. Thus, the driver may use the engine for all braking except full emergency braking without being required to go through the inconvenient motions of taking his foot from the throttle pedal and then applying the brake. Instead, the driver may through the application of lateral pressure on the throttle pedal 280 cause the ratio position of the rollers 34 to change as rapidly towards a "neutral" position as may be required for convenient engine braking to be developed. It will be observed that this control may be carried out even with the throttle pedal 280 disposed in a closed position as would be the case when decelerating to a stop.

It should be especially noted that the mounting of the outer end of the link element 282 between the centering springs 290 and 292 reduces the sensitiveness of the control exerted by the throttle pedal 280, inasmuch as more lateral movement of this pedal will be required than if the link element 282 was directly affixed to the control rod 288. In this manner inadvertent lateral movements of the throttle pedal 280 will not effect the action of the valve element 208. The aforedescribed foot throttle ratio control does not actually lift or close the governor valve element 208 but instead it simply applies graduated and controlled spring force tending to open or close this valve.

Alternate throttle pedal mounting

Referring now to Figures 15, 16 and 17, there is shown an alternate form of throttle pedal mounting for use with the aforedescribed control unit. In this form the throttle pedal 280a is formed at its lower end with a pivot pin 380. The latter is rotatably disposed within a bore 382 centrally formed in a horizontally extending post 384. The ends of the post 384 are journaled between a pair of upstanding ears 386 secured to the floorboard 299. The upper portion of the throttle pedal 280a is formed at its underside with a socket 388 wherein is disposed a complementary ball 390 formed at the upper end of a lever 300a corresponding to the lever 300 described hereinabove in connection with the throttle pedal control shown in Figure 8. The upper portion of the throttle pedal 280a is formed with upstanding walls 392 for receiving the front portion of the driver's foot. The modified throttle pedal arrangement includes a cross arm 304a which is connected to the throttle 306a of the vehicle's engine. With this arrangement, the driver may move the throttle pedal 280a laterally without being required to tilt it. In this regard, the walls 392 formed on the upper portion of the throttle pedal may be engaged by the side of the driver's shoe during such lateral movement of the throttle pedal.

*Emergency clutch release control*

Referring to Figure 8, a control handle 340 is mounted adjacent the steering column 260 for effecting release of the clutch 138. The lower end of this control handle 340 is connected to one end of the control rod 148, the opposite end of this control rod being pivotally connected to the lower end of the shifting fork 142, as shown in Figure 1. The clutch 138 may be disengaged should it become necessary to tow the vehicle. Preferably, the clutch 138 will be provided with a hydraulic interlock device for preventing its inadvertent disengagement while the vehicle's engine is in operation. A suitable arrangement is shown in Figures 1 and 4 comprising a plunger 344 slidably disposed in a horizontal bore 346 formed in the housing 63. One end of the bore 346 is in communication with the engine's oil pressure by means of a passage 348. During operation of the engine the plunger 344 will be maintained in its extended position of Figure 1 wherein its outer end abuts the rear of the shifting fork 142. Accordingly, the latter cannot act to move the clutch sleeve 140 rearwardly. When the engine is not operating, however, the plunger 344 will be retracted under the influence of a helical compression spring 350 so as to clear the shifting fork 142.

*Pre-load release spring control for permitting the vehicle to be given a push start*

Referring to Figures 8 and 10, a foot pedal 352 is shown mounted on the floorboard 299. This foot pedal 352 is adapted for use with a driver's left foot and it is attached to one end of a control rod 354. As shown in Figure 1, the opposite end of this control rod 354 is affixed to the lower end of a fork element 360 which is pivotally mounted at its intermediate portion to the lower front portion of the housing 63 by a horizontal pivot pin 362. The upper ends of the bifurcations 364 of this fork element 360 are formed with pads 366 that abut the thrust flange 84 of input bearing cup 80 at two diametrically opposed points. When the driver depresses the foot pedal 352 the control rod 354 will pull the lower end of the fork 360 rearwardly thereby causing the pads 366 to urge the pre-load spring 82 and collar 80 forwardly from the position shown in Figure 1. In this manner the rearwardly-acting force of the pre-load spring will be overcome and the rotation-transfer rollers 34 will be free to be returned to a neutral position. The hand lever 270 of the selector 262 may then be employed to shift the rollers 34 into the proper position for a one-to-one transmission ratio position inasmuch as the rollers are free of load. The aforedescribed arrangement also permits a driver to return the rollers 34 to a "neutral" ratio where he may have stalled his engine and rolled to a stop with the rollers disposed in some ratio other than neutral. It is necessary to return the rollers to a "neutral" position, otherwise the starter would be required to both turn over the engine and also move the vehicle by means of the transmission.

Preferably, a hydraulic interlock will be provided for the pre-load release mechanism so as to prevent the pre-load spring 82 from being released when the vehicle's engine is in operation. A suitable hydraulic interlock is shown in Figures 1 and 5. Referring to these figures, this interlock includes a plunger 368 slidably disposed in a horizontal bore 370 formed in the housing 63. One end of this bore 370 is in communication with the engine's oil pressure. During operation of the engine the plunger 368 will be maintained in its extended position of Figures 1 and 5 by the oil pressure. In such extended position its outer end abuts an ear 372 formed upon the intermediate portion of the fork 360 so as to prevent the latter to be pivoted from its position of Figure 1. When the engine is not operating, however, the plunger 368 will be retracted under the influence of a helical compression spring 374 whereby the fork 360 may be pivoted by the control rod 354.

*Cooling and lubricating means for use with the basic unit*

Referring again to Figure 1, preferably the basic unit of the transmission will be formed with internal cooling and lubricating means. To this end the drive shaft 42 is coaxially formed with a blind core 396 extending from its rear end. The front portion of this bore 396 is intersected by a ulurality of aligned radially extending passages 398. The radially outer ends of these latter passages 398 are in alignment with the radially inner end of a plurality of radially outwardly and forwardly extending passages 400 formed through the driving disc 30. A second plurality of aligned radially extending passages 402 are formed rearwardly of the first and communicate with the inner end of a plurality of radially outwardly and rearwardly extending passages 404 formed through the driven disc 32. Rearwardly of this point the drive shaft 42 is formed with additional sets of aligned radially extending passages 406, 408 and 410. The passages 408 are in alignment with the radially inner end of the aforedescribed collector ring 123. The radially outer end of passages 410 are aligned with the radially inner ends of a plurality of radially outer and rearwardly extending passages 412 formed in the sun cone 54.

Lubricating oil is forced into the bore 396 by means of a suitable oil pump 414 disposed within the lower portion of the housing 63. The inlet of this pump is in communication with the oil sump 190 by a short length of pipe 416. The discharge of this pump is in communication with a manifold ring 418 which encompasses the shaft 42 by means of a pipe 419. The interior of this manifold ring 418 is in turn in communication with the radially outer end of a plurality of aligned radially extending passages 420 formed in the shaft 42 and intersecting the shaft bore 396.

With this arrangement, the driving and driven discs 30 and 32, respectively, will be cooled by the oil flowing through their passages 400 and 404. This oil, however, is not permitted to reach the opposed surfaces 36 and 38 of these discs. The oil flowing through the passages 406 serves to cool and lubricate the parts of the torque responsive unit 46. The oil forced through the passages 408 and 410 will serve to both cool and lubricate the various elements of the planetary rollers 57 and the sun gear 54. In this regard, it will be observed that the upper portion of the planetary roller shafts 120 are formed with passages 422 through which this oil may flow. Accordingly, the oil will serve to lubricate and cool the confronting surfaces of the shaft flanges 121 and the carrier surface 53. It will be apparent that the oil will be urged radially outwardly under the influence of centrifugal force during operation of the transmission.

It is preferable that the cooling and lubricating oil be prevented from contacting the opposed concave surfaces 36 and 38, respectively, of the driving disc 30 and the driven disc 32, inasmuch as it could cause slippage between these surfaces and those of the rotation-transfer rollers 34. Accordingly, the housing 63 is formed with collector means for returning the oil to the sump 190. Thus, the oil emerging from the radially outer ends of the driving disc passages 400 will enter an annular space 426 in the housing. Under the influence of gravity the oil entering this space 426 will return to the lower portion of the housing 63 and thence through an opening 428 formed in the lower wall of the housing into the confines of the sump 190. The oil emerging from the radially outer ends of the driven disc passages 404 will enter an annular space 430 defined by a pair of flanges 432 integrally formed on the housing 63. Likewise, the oil flowing through the radial passages 406 of the drive shaft will enter this space 430 after having been urged radially outwardly between radial passage defined between the front surface of the ring cone 48 and the rear surface of the driven disc 32. The oil collected within this space 430 will enter the sump 190 by means of the aforedescribed opening 428 or a similar opening 434 formed in the lower wall of the housing 63. The oil flowing radially outwardly through the passages 408 and 410 of the drive shaft will likewise enter the sump 190 through this rear opening 434.

It should be especially noted that although the power take-off member P is shown and described hereinabove as utilizing a ring cone, a sun cone and cone-type planetary rollers, these elements will also function if they are of the spur or bevel gear type. Cone type elements have proven desirable, however, inasmuch as they are inherently silent, comparatively inexpensive to fabricate, smoother in power transmission, compact in size and they may be placed in the same housing as the variable ratio assembly V so as to utilize the same lubricant and the same torque responsive unit 146. Additionally, the use of cone type elements permits a reduction in the number of bearings required and a reduction in the thrust load applied to the bearing for the driving disc 30.

Other modifications and changes may be made with respect to the aforedescribed construction without departing from the spirt of the invention or the scope of the following claims.

I claim:

1. Transmission apparatus, comprising: a frame: a drive shaft rotatably carried by said frame; a pair of coaxial driving and driven discs formed with spaced apart opposed concave surfaces of revolution approximating a toric section, said driving disc being keyed to the front portion of said drive shaft and said driven disc being journaled by the intermediate portion of said drive shaft; a plurality of conically-profiled rotation-transfer rollers interposed between said discs and each being formed with a convex surface bridging the concave surfaces of said discs; mounting means interposed between said frame and said rotation transfer rollers; a ring cone member coaxial with and adjacent the rear of said driven disc, said ring cone having an axially forwardly inclined contact surface; a coaxial sun cone member keyed to said drive shaft and having an axially rearwardly inclined contact surface; a plurality of planetary rollers rotatably interposed between said ring and sun cones, said planetary rollers having radially outwardly inclined driving surfaces engaged with the contact surfaces of said ring and sun cones; a coaxial carrier for rotatably supporting said planetary rollers, said carrier being rotatably mounted adjacent the rear end of said drive shaft; and a torque-responsive unit interposed between said disc and said ring cone member for camming them axially apart upon an increase in the load applied to said carrier.

2. A transmission as set forth in claim 1 wherein the torque-responsive unit interposed between said driven disc and ring cone members includes a smooth raceway formed on one member, a second raceway formed on the other member and defined by a plurality of pockets having inclined camming surfaces, and a ball disposed in each of said pockets.

3. A transmission as set forth in claim 1 wherein the torque-responsive unit interposed between said driven disc and ring cone members includes a smooth inner raceway formed on the rear portion of said driven disc, an outer raceway formed on the front of said ring cone and defined by a plurality of pockets having inclined camming surfaces, and a ball disposed in each of said pockets.

4. Transmission apparatus, comprising: a frame; a drive shaft rotatably supported by said frame; a pair of coaxial driving and driven discs, said driving disc being keyed to the front portion of said drive shaft and said driven disc being journaled by the intermediate portion of said drive shaft; a plurality of rotation-transfer rollers interposed between said discs; mounting means interposed between said frame and said rotation-transfer rollers; a ring cone coaxial with and mounted adjacent the rear of said driven disc; a coaxial sun cone keyed to the rear of said drive shaft; a plurality of planetary rollers rotatably interposed between said ring and sun cones; a coaxial carrier for rotatably supporting said planetary rollers, said carrier being rotatably mounted adjacent the rear end of said drive shaft; and support means interposed between said planetary rollers and said carrier, said planetary rollers being free to move axially and angularly relative to said carrier within fixed limits whereby they may adjust their positions responsive to slight deflections between said ring and sun cones.

5. Transmission apparatus, comprising: a frame; a drive shaft rotatably supported by said frame; a pair of coaxial driving and driven discs formed with spaced apart opposed concave surfaces of revolution approximating a toric section, said driving disc being keyed to said drive shaft and said driven disc being journaled by the intermediate portion of said drive shaft; a plurality of conically profiled rotation-transfer rollers interposed between said discs and each being formed with a convex surface bridging the concave surfaces of said discs; mounting means interposed between said frame and said rotation-transfer rollers; a ring cone coaxial with and mounted adjacent the rear of said driven disc; a coaxial sun cone keyed to the rear of said drive shaft; a plurality of planetary rollers interposed between said ring and sun cones; a coaxial carrier for rotatably supporting said planetary rollers rotatably mounted at the rear of said drive shaft; mounting means interposed between said carrier and said planetary rollers, said planetary rollers being free to move axially and angularly relative to said carrier within fixed limits whereby they may adjust their positions responsive to slight deflections between said ring and sun cones; a coaxial driven shaft keyed to said carrier; and a torque-responsive unit interposed between said driven disc and said ring cone for camming them axially apart upon an increase in the load applied to said driven shaft.

6. Transmission apparatus, comprising: a frame; a drive shaft rotatably supported by said frame; a pair of coaxial driving and driven discs, said driving disc being keyed to said drive shaft and said driven disc being journaled by the intermediate portion of said drive shaft; a plurality of rotation-transfer rollers interposed between said discs; mounting means interposed between said frame and said rotation-transfer rollers; a ring cone coaxial with and mounted adjacent the rear of said driven disc; a coaxial sun cone keyed to the rear of said drive shaft; a plurality of planetary rollers interposed between said ring and sun cones; a plurality of radially extending shafts, each journaling one of said planetary rollers; a boss formed at the radially outer end of each of said radially extending shafts; and a coaxial carrier for rotatably supporting said planetary roller rotatably mounted at the rear of said drive shaft, said carrier being formed with a plurality of axially extending elongated slots for slidably receiving said bosses so as to permit said planetary rollers to freely move axially and angularly relative to said carrier within fixed limits whereby they may adjust their positions responsive to slight deflections between said ring and sun cones.

7. Transmission apparatus, comprising: a frame; a drive shaft rotatably supported by said frame; a pair of coaxial driving and driven discs formed with spaced apart opposed concave surfaces of revolution approximating a toric section, said driving disc being keyed to the front portion of said drive shaft and said driven disc being journaled by the intermediate portion of said drive shaft; a plurality of conically-profiled rotation-transfer rollers interposed between said discs and formed with a convex surface bridging the concave surfaces of said discs; mounting means interposed between said frame and said rotation-transfer rollers; a ring cone coaxial with and mounted adjacent the rear of said driven disc; a coaxial sun cone keyed to the rear of said drive shaft; a plurality of planetary rollers interposed between said ring and sun cones; a plurality of radially extending shafts, each journaling one of said planetary rollers; a boss formed at the radially outer end of each of said radially extending shafts; a coaxial carrier for rotatably supporting said planetary rollers rotatably mounted at the rear of said drive shaft, said carrier being formed with a plurality of axially extending elongated slots for slidably receiving said bosses so as to permit said planetary rollers to freely move axially and angularly relative to said carrier within fixed limits whereby they may adjust their positions responsive to slight deflections between said ring and sun cones; a coaxial driven shaft keyed to said carrier; and a torque-responsive unit interposed between said driven disc and said ring cone for camming them axially apart upon an increase in the load applied to said driven shaft.

8. Transmission apparatus, comprising: a frame; a drive shaft rotatably supported by said frame; a pair of coaxial driving and driven discs, said driving disc being keyed to the front portion of said drive shaft and said driven disc being journaled by the intermediate portion of said drive shaft; a plurality of rotation-transfer rollers interposed between said discs; mounting means interposed between said frame and said rotation-transfer rollers; a ring cone coaxial with and mounted adjacent the rear of said driven disc; a coaxial sun cone keyed to the rear of said drive shaft; a plurality of planetary rollers interposed between said ring and sun cones; a plurality of radially extending shafts, each journaling one of said planetary rollers, the radially outer end of each of said shafts being formed with a spherically shaped surface; a coaxial carrier rotatably mounted at the rear of said drive shaft, said carrier being formed with a radially inwardly facing curved surface engaged with the radially outer ends of said planetary roller shafts, the profile radius of said surface being greater than the spherical radius of said planetary roller shafts; and means keying said planetary roller shafts to said carrier so as to permit said planetary rollers to move axially and angularly relative to said carrier within fixed limits whereby they may adjust their positions responsive to slight deflections between said ring and sun cones.

9. A transmission as set forth in claim 8 wherein the radially outer end of said planetary roller shafts are formed with a boss which is slidably disposed within an axially extending elongated slot formed in said carrier.

10. Transmission apparatus, comprising: a frame; a drive shaft rotatably supported by said frame; a pair of coaxial driving and driven discs formed with spaced apart opposed concave surfaces of revolution approximating a toric section, said driving disc being keyed to the front portion of said drive shaft and said driven disc being journaled by the intermediate portion of said drive shaft; a pluarlity of conically-profiled rotation-transfer rollers interposed between said discs and formed with a convex surface bridging the concave surfaces of said discs; mounting means interposed between said frame and said rotation-transfer rollers; a ring cone coaxial with and mounted adjacent the rear of said driven disc; a coaxial sun cone keyed to the rear of said drive shaft; a plurality of plentary rollers interposed between said ring and sun cones; a plurality of radially extending shafts, each journaling one of said planetary rollers, each of said shafts being formed at its radially outer end with a boss; a coaxial carrier rotatably mounted at the rear of said drive shaft, said carrier being formed with a radially inwardly facing curved surface engaged with the radially outer ends of said planetary roller shafts, the profile radius of said surface being greater than the spherical radius of said planetary roller shafts and means keying said planetary roller shafts to said carrier so as to permit said planetary rollers to move axially and angularly relative to said carrier within fixed limits whereby they may adjust their positions responsive to slight deflections between said ring and sun cones; a coaxial driven shaft keyed to said carrier; and a torque-responsive unit interposed between said driven disc and said ring cone for camming them axially apart upon an increase in the load applied to said driven shaft.

11. A transmission as set forth in claim 8 wherein the radially outer end of said planetary roller shafts are formed with a boss which is slidably disposed within an axially extending elongated slot formed in said carrier.

12. Transmission apparatus, comprising: a housing; a drive shaft rotatably mounted in said housing; a pair of coaxial driving and driven discs, said driving disc being keyed to the front portion of said drive shaft and said driven disc being supported for rotation independently of said drive shaft at the intermediate portion thereof; a plurality of rotation-transfer rollers mounted by said housing and interposed between said discs; a ring cone coaxial with and adjacent the rear of said driven disc; a coaxial sun cone keyed to the rear portion of said drive shaft; a plurality of planetary rollers interposed between said ring and sun cones; a coaxial carrier rotatably supporting said planetary rollers rotatably mounted adjacent the rear end of said drive shaft; an axially extending bore formed in said drive shaft; means to force lubricating fluid into said drive shaft bore; a plurality of radially extending passages formed in said drive shaft intersecting said bore; and a plurality of radially extending passages formed in said driving disc, said driven disc and said sun cone intersecting said drive shaft passages in order that rotation of said drive shaft will cause centrifugal force to urge said lubricating fluid radially outwardly from said drive shaft bore through said passages.

13. Transmission apparatus, comprising: a housing having a sump at its lower portion; a drive shaft rotatably mounted in said housing; a pair of coaxial driving and driven discs formed with spaced-apart opposed concave surfaces of revolution approximating a toric section, said driving disc being keyed to the front portion of said drive shaft and said driven disc being journaled by the intermediate portion of said drive shaft, said driving disc being formed with a pluarlity of radially outwardly and forwardly extending passages and said driven disc being formed with a pluarlity of rearwardly and radially outwardly extending passages; a plurality of conically-profiled rotation-transfer rollers interposed between said discs and each being formed with a convex surface bridging the concave surfaces of said discs; mounting means interposed between said housing and said rotation-transfer rollers; a ring cone coaxial with and mounted adjacent the rear of said driven disc, a radial passage being defined therebetween; a coaxial sun cone keyed to the rear of said drive shaft; a plurality of rearwardly and radially outwardly extending passages formed in said sun cone; a plurality of planetary rollers interposed between said ring and sun cones; a coaxial carrier for rotatably supporting said planetary rollers rotatably mounted at the rear of said drive shaft; an axially extending bore formed in said drive shaft; a plurality of axially spaced sets of radially extending passages formed in said drive shaft intersecting said bore, said passages being aligned with the aforesaid passages; pump means interconnecting said sump and said drive shaft bore whereby rotation of said drive shaft will cause centrifugal force to urge said lubricating fluid radially outwardly from said drive shaft bore through said passages; and collector means in said housing for returning said lubricating fluid to said sump without contacting the concave surfaces of said discs.

14. Transmission apparatus, comprising: a housing; a drive shaft rotatably mounted in said housing; a pair of coaxial driving and driven discs, said driving disc being keyed to the front portion of said drive shaft and said driven disc being supported for rotation independently of said drive shaft at the intermediate portion thereof; a plurality of rotation-transfer rollers mounted by said housing and interposed between said discs; a ring cone coaxial with and adjacent the rear of said driven disc; a coaxial sun cone keyed to the rear portion of said drive shaft; a plurality of planetary rollers interposed between said ring and sun cones; a plurality of radially extending shafts, each journaling one of said planetary rollers, the radially outer end of each of said shafts being formed with a spherically shaped surface; a coaxial carrier rotatably mounted at the rear of said drive shaft, said carrier being formed with a radially inwardly facing curved surface engaged with the radially outer ends of said planetary roller shafts, the profile radius of said surface being greater than the spherical radius of said planetary roller shafts; means keying said planetary roller shafts to said carrier so as to permit said planetary rollers to move axially and angularly relative to said carrier within fixed limits whereby they may adjust their positions responsive to slight deflections between said ring and sun cones; an axially extending bore formed in said drive shaft; means to force lubricating fluid into said drive shaft bore; a plurality of radially extending passages formed in said drive shaft intersecting said bore; and a plurality of radially extending passages formed in said planetary roller shafts and aligned with one of said sets of drive shaft passages.

15. Transmission apparatus, comprising: a frame; a drive shaft rotatably supported by said frame; a pair of coaxial driving and driven discs, said driving disc being keyed to the front portion of said drive shaft and said driven disc being journaled by the intermediate portion of said drive shaft; a plurality of rotation-transfer rollers interposed between said discs; mounting means interposed between said frame and said rotation-transfer rollers; a ring cone coaxial with and mounted adjacent the rear of said driven disc; a coaxial sun cone keyed to the rear of said drive shaft; a plurality of planetary rollers interposed between said ring and sun cones; a plurality of radially extending shafts, each journaling one of said planetary rollers, the radially outer end of each of said shafts being formed with a spherically shaped surface; a coaxial carrier rotatably mounted at the rear of said drive shaft, said carrier being formed with a radially inwardly facing curved surface engaged with the radially outer ends of said planetary roller shafts, the profile radius of said surface being greater than the spherical radius of said planetary roller shafts; means keying said planetary roller shafts to said carrier so as to permit said planetary rollers to move axially and angularly relative to said carrier within fixed limits whereby they may adjust their positions responsive to slight deflections between said ring and sun cones; an axially extending bore formed in said drive shaft; means to force lubricating fluid into said drive shaft bore; a plurality of radially extending passages formed in said drive shaft intersecting said bore; and a plurality of radially extending passages formed in said planetary roller shafts and aligned with one of said sets of drive shaft passages whereby said lubricating fluid may be conducted to the contacting surfaces between said planetary roller shafts and said carrier.

16. A transmission for use with an engine, comprising: a frame; a drive shaft rotatably supported by said frame and connectible to said engine; a pair of coaxial driving and driven discs, said driving disc being keyed to said drive shaft and said driven disc being journaled by the intermediate portion of said drive shaft; a plurality of rotation-transfer rollers interposed between said discs and supported by said frame; a ring cone coaxial with and mounted adjacent the rear of said driven disc; a coaxial sun cone keyed to the rear of said drive shaft; a plurality of planetary rollers interposed between said ring and sun cones; a coaxial carrier for rotatably supporting said planetary rollers, said carrier being rotatably mounted at the rear of said drive shaft; a coaxial driven shaft rearwardly of said carrier; clutch means interposed between said driven shaft and said carrier, said clutch including a manually controlled shifting element; and interlock means for restraining de-clutching movement of said shifting element when said engine is in operation.

17. A transmission as set forth in claim 16 wherein said interlock means includes a hydraulic cylinder and plunger, said plunger being retained in the path of said shifting element during operation of said engine, and spring means for urging said plunger out of the path of said shifting element when said engine is not in operation.

18. A transmission for use with an engine, comprising: a frame; a drive shaft rotatably supported by said frame and connectible to said engine; a pair of coaxial driving and driven discs, said driving disc being keyed to said drive shaft and said driven disc being journaled by the intermediate portion of said drive shaft; a plurality of rotation-transfer rollers interposed between said discs and supported by said frame; a ring cone coaxial with and mounted adjacent the rear of said driven disc; a coaxial sun cone keyed to the rear of said drive shaft; a plurality of planetary rollers interposed between said ring and sun cones; a coaxial carrier for rotatably supporting said planetary rollers, said carrier being rotatably mounted at the rear of said drive shaft, and said carrier being formed with axially extending splines; a coaxial driven shaft rearwardly of said carrier, said driven shaft being formed with complementary splines adjacent those of said carrier; a coaxial clutch sleeve formed with internal splines complementary to those of said carrier and said driven shaft, said clutch sleeve being axially movable relative to said carrier and said driven shaft between a first position wherein it keys them together for concurrent rotation and a second position wherein they are not keyed together; a manually controlled shifting element for effecting axial movement of said sleeve between its first and second positions; and interlock means for restraining unclutching movement of said shifting element when said engine is in operation.

19. A transmission as set forth in claim 18 wherein said interlock means includes a hydraulic cylinder and plunger, said plunger being retained in the path of said shifting element during operation of said engine, and spring means for urging said plunger out of the path of said shifting element when said engine is not in operation.

20. A transmission as set forth in claim 19 wherein said shifting element includes a fork pivotally mounted by said frame and having its free end attached to said clutch sleeve, said plunger abutting one side of said fork during operation of said engine.

21. Transmission apparatus for use with an engine, comprising: a frame; a drive shaft rotatably supported by said frame; a pair of coaxial driving and driven discs formed with spaced-apart concave surfaces of revolution approximating a toric section, said driving disc being keyed to said drive shaft but movable axially relative thereto and said driven disc being supported for rotation independently of said drive shaft; a conically-profiled rotation-transfer roller interposed between said discs and formed with a convex surface bridging the concave surfaces of said discs; mounting means interposed between said frame and said rotation-transfer roller and permitting the ratio position of said roller relative to said discs to be varied; pre-load spring means interposed between said frame and said driving disc for constantly biasing said driving disc towards said driven disc; a manually controlled element for overcoming the force of said pre-load spring means whereby said driving disc may be moved axially away from said driven disc and said rotation-transfer rollers may be moved to a neutral position; and interlock means restraining movement of said manually controlled element to overcome the force of said pre-load spring means during operation of said engine.

22. Transmission apparatus as set forth in claim 20 wherein said interlock means includes a hydraulic cylinder and plunger, said plunger being disposed in the path of said manually controlled element when said engine is in operation.

23. Transmission apparatus for use with an engine, comprising: a frame; a drive shaft rotatably supported by said frame; a pair of coaxial driving and driven discs formed with spaced-apart concave surfaces of revolution approximating a toric section, said driving disc being keyed to said drive shaft but movable axially relative thereto and said driven disc being supported for rotation independently of said drive shaft; a conically-profiled rotation-transfer roller interposed between said discs and formed with a convex surface bridging the concave surfaces of said discs; mounting means interposed between said frame and said rotation-transfer roller and permitting the ratio position of said roller relative to said disc to be varied; coaxial bearing means interposed between the front of said driving disc and said frame; a thrust cup axially slidably encompassing said bearing means and formed with a radially extending thrust flange; a pre-load spring interposed between the front of said thrust flange and said frame for constantly biasing said driving disc rearwardly towards said driven disc; a manually controlled element engageable with said thrust flange for urging it forwardly whereby the force of said pre-load spring will be overcome and said driving disc may be moved axially away from said driven disc so as to permit said rotation-transfer roller to be moved to a neutral position; and interlock means for restraining movement of said manually controlled element during operation of said engine.

24. Transmission apparatus as set forth in claim 23 wherein said interlock means include a hydraulic cylinder and plunger, said plunger being maintained in the path of said manually controlled element when said engine is in operation.

25. Transmission apparatus as set forth in claim 24 wherein said manually controlled element is a fork pivotally secured to said frame and having the free ends of its bifurcations in engagement with the rear of said thrust flange.

26. Transmission apparatus for use with a vehicle having an engine, comprising: a frame; a drive shaft rotatably supported by said frame and connectible to said engine; a pair of coaxial driving and driven discs, said driving disc being keyed to said drive shaft and said driven disc being supported for rotation independently of said drive shaft; a plurality of rotation-transfer rollers interposed between said discs and bridging said discs; support means interposed between said rollers and said frame permitting the ratio position of said rollers relative to said discs to be varied; a ring cone member coaxial with and adjacent to said driven disc; a coaxial sun cone member keyed to the rear end of said drive shaft; a plurality of planetary rollers rotatably interposed between said ring and sun cones; a coaxial carrier for rotatably supporting said planetary rollers, said carrier being rotatably mounted adjacent the rear end of said drive shaft; a driven shaft connected to said carrier; a pump driven by said engine for pumping liquid at a rate proportional to the rotational speed of said engine; a return line in communication with the discharge of said pump; control means in communication with said return line and operatively connected to said rotation-transfer roller so as to adjust its ratio position responsive to the volume of liquid flowing through said return line; valve means controlling the volume of liquid flowing through said return line; governor means driven by said engine and operatively connected to said valve means so as to normally control the operation thereof; and manually-actuated controls connected to said control means and valve means so as to over-ride the effect of said governor means.

27. A transmission as set forth in claim 26 wherein said control means includes a control cylinder having one of its ends in communication with said return line, a piston reciprocally disposed within said control cylinder, a shifting rod affixed to said piston and connected with said rotation-transfer roller, and spring means constantly biasing said piston towards said one end of said control cylinder.

28. A transmission as set forth in claim 26 wherein said governor is driven by a drive shaft and includes a first member keyed to said drive shaft and a second member axially movable relative thereto and connected to said valve means, the confronting surfaces of said first and second members being formed with a generally hemispherical chamber wherein are disposed a plurality of ball elements, and spring means constantly biasing said second member towards said first member.

29. A transmission as set forth in claim 27 wherein said governor is driven by a drive shaft and includes a first member keyed to said drive shaft and a second member axially movable relative thereto and connected to said valve means, the confronting surfaces of said first and second members being formed with a generally hemispherical chamber wherein are disposed a plurality of ball elements, and spring means constantly biasing said second member towards said first member.

30. A transmission as set forth in claim 28 wherein said drive shaft also operates said pump.

31. Transmission apparatus for use with a vehicle having an engine, comprising: a frame; a drive shaft rotatably supported by said frame and connectible to said engine; a pair of coaxial driving and driven discs, said driving disc being keyed to said drive shaft and said driven disc being supported for rotation independently of said drive shaft; a rotation-transfer roller interposed between said discs and bridging said discs; support means interposed between said roller and said frame permitting the ratio position of said roller relative to said discs to be varied; a ring cone member coaxial with and adjacent to said driven disc; a coaxial sun cone member keyed to the rear end of said drive shaft; a plurality of planetary rollers rotatably interposed between said ring and sun cones; a coaxial carrier for rotatably supporting said planetary rollers, said carrier being rotatably mounted adjacent the rear end of said drive shaft; a driven shaft connected to said carrier; a pump driven by said engine for pumping liquid at a rate proportional to the rotational speed of said engine; a return line in communication with the discharge of said pump; control means in communication with said return line and operatively connected to said rotation-transfer roller so as to adjust its ratio position responsive to the volume of liquid flowing through said return line; valve means controlling the volume of liquid flowing through said return line; governor means driven by said engine and operatively connected to said valve means so as to control the operation thereof; manually-actuated selector means operatively connected to said control means for over-riding said governor means; and manually-actuated accelerator means operatively connected to said valve means for over-riding the effect of said governor means.

32. A transmission as set forth in claim 31 wherein said control means includes a control cylinder having one of its ends in communication with said return line, a piston reciprocally disposed within said control cylinder, an axially movable shifting rod affixed to said piston and connected with said rotation-transfer roller, and spring means constantly biasing said piston towards said one end of said control cylinder, said shifting rod also being connected with said selector means.

33. A transmission as set forth in claim 31 wherein said accelerator means includes an accelerator pedal connected to said engine for controlling the throttle setting thereof, and mounting means for said pedal permitting it to undergo lateral movement while being moved in a vertical plane, said lateral movement effecting concurrent control of said valve means.

34. A transmission as set forth in claim 31 wherein said governor is driven by a drive shaft and includes a first member keyed to said drive shaft and a second member axially movable relative thereto and connected to said valve means, the confronting surfaces of said first and second members being formed with a generally hemispherical chamber wherein are disposed a plurality of ball elements, and spring means constantly biasing said second member towards said first member, said accelerator means being connected to said second member.

35. A transmission as set forth in claim 34 wherein said drive shaft also operates said pump.

36. Transmission apparatus, comprising: a frame; a drive shaft; a pair of coaxial driving and driven discs formed with spaced apart opposed concave surfaces of revolution approximating a toric section, said driving disc being keyed to said drive shaft and said driven disc being supported for rotation independently of said drive shaft; a conically-profiled rotation-transfer roller interposed between said discs and formed with a convex surface bridging the concave surfaces of said discs; mounting means interposed between said frame and said rotation-transfer roller; a ring cone coaxial with and adjacent to said driven disc; a coaxial sun cone keyed to said drive shaft; a planetary cone-shaped roller rotatably interposed between said ring and sun cones; a coaxial carrier rotatably supporting said planetary roller, said carrier being rotatably mounted adjacent the rear end of said drive shaft; a coaxial output shaft connected to and driven by said carrier; and, a torque-responsive unit interposed between said driven disc and said ring cone for camming them axially apart upon an increase in the load applied to said output shaft.

References Cited in the file of this patent

UNITED STATES PATENTS

| | | |
|---|---|---|
| 1,175,677 | Barnes | Mar. 14, 1916 |
| 1,496,123 | Jones | June 3, 1924 |
| 2,100,632 | Chilton | Nov. 30, 1937 |
| 2,239,087 | Erban | Apr. 22, 1941 |